INVENTOR.
OSCAR W. STROHM.
ATTORNEYS.

United States Patent Office 2,897,925
Patented Aug. 4, 1959

2,897,925

REINFORCED CAST BRAKE DRUM AND METHOD OF CONDITIONING USED BRAKE DRUMS

Oscar W. Strohm, Pittsburgh, Pa.

Application February 13, 1953, Serial No. 336,666

2 Claims. (Cl. 188—218)

This invention relates, as indicated, to a reinforced cast brake drum of iron, steel or ferrous alloy and to a method of conditioning used brake drums for re-use.

More particularly, the primary concern of this invention is the provision of a cast brake drum having a reinforced construction which is directed to the end of eliminating failure by reason of "heat checking."

The brake drums of this invention are heavy duty cast drums of the type used on trucks which may have internal diameters of from about 14 inches up to about 21 inches, axial depths of from about 5 inches up to about 12 inches, and a radial thickness of the metal in the drum element of from about 1 inch to about 1¾ inches. In many cases, the drums are cast with an integral reinforcing ledge at its outer edge having a radial thickness of 2 inches or better. The drum elements must have a radial thickness of the character referred to in order to provide the strength required to withstand the pressures developed upon application of a brake shoe thereto. Under severe loading, cast steel drums of this type develop "heat checking" which is a condition in which the braking surface of the drum becomes roughened and contains a multitude of small cracks. Upon development of this condition, it is necessary to remove the drum and machine and grind its braking surface if it is to be used again. In some cases, the cracks penetrate through the entire depth of the drum element and present a condition of heat checking which is so bad that the drum cannot be rehabilitated and must be replaced.

Heat checking of drums is caused by unequal thermal expansion of the metal radially outwardly of the braking surface. When a brake shoe is applied to the surface of a drum, the heat generated raises the temperature of its braking surface which tends to expand in accordance with the temperature rise. However, thermal expansion of the metal at the braking surface is resisted by the relatively cool metal radially outwardly thereof. Since the heated metal at the braking surface consists only of a layer of skin depth and this layer cannot expand in a circumferential direction because of the resistance of the relatively cool metal outwardly thereof, it is forced to expand inwardly and is consequently subjected to high stress. The repeated stressing of the metal at the braking surface in this manner eventually results in the formation of cracks and the condition known as "heat checking." The extent of this unequal thermal expansion will be apparent when consideration is given to the fact that the temperature difference between the inner and outer surfaces of the drum may be as much as 1000° F. or greater. The tendency of a drum to "heat check" increases with the radial thickness of the metal in the drum element as required for strength purposes.

This invention has as its principal object the provision of a cast drum of reinforced construction which eliminates the heat checking condition of the character referred to. To this end, the cylindrical drum element forming the braking surface is constructed with a radial thickness of metal such that the force caused by the thermal expansion of the heated layer of metal at its braking surface will expand the metal radially outwardly therefrom. As compared to conventionally cast steel drums, the thickness of the metal forming the drum which will allow this expansion is such that the drum has insufficient mechanical strength to withstand the braking pressures which are applied thereto by a braking shoe under normal operating conditions. To supply the mechanical strength for withstanding such braking pressures, the drum element is provided with one or more reinforcing steel rings on its outer surface. In the preferred practice of the invention, the reinforcing rings are provided with a loose fit on the drum so that the drum is permitted an initial unrestrained expansion before the reinforcing action of the rings becomes effective. In a manner to be described, the principles of this invention are adaptable both to the fabrication of new drums and to the rehabilitation of used drums of conventional construction. Other objects and advantages of the invention will become apparent from the following description.

In the drawings there are shown several embodiments of the invention. In this showing:

Figure 1:
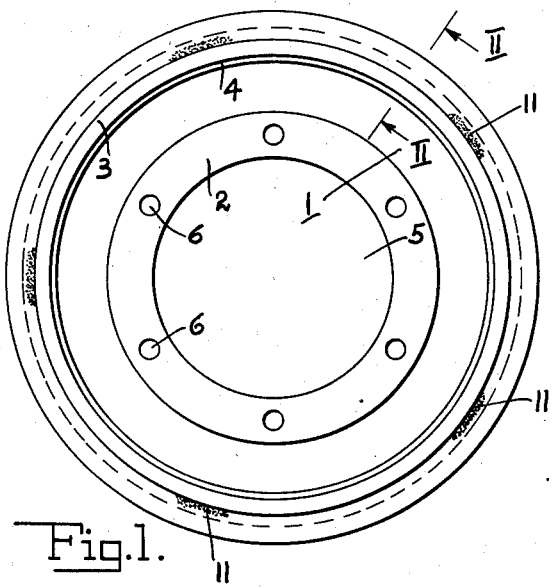
Fig. 1 is an end elevational view of a drum constructed in accordance with the principles of this invention.

In Fig. 1, the numeral 1 designates a brake drum having a hub 2 provided with a cylindrical drum element 3 integrally connected with and extending outwardly from its peripheral edge. The drum element 3 provides an internal cylindrical braking surface 4 for cooperation with brake shoes (not shown) of the expanding type in a conventional manner. The hub 2 is provided with a central opening 5 and a plurality of bolt receiving openings 6 at spaced intervals about the central opening 5 for attachment to a truck wheel. The drum is a cast drum in which the hub 2 and drum element 3 are cast from iron, steel or steel alloys by the same operation in accordance with conventional practice.

Figure 4:
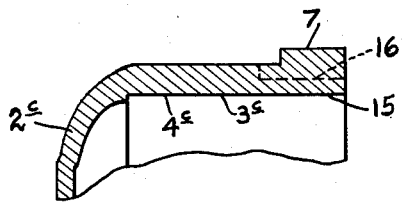
Fig. 4 is a view similar to Fig. 2 illustrating a cast drum of typical conventional construction.

Referring now to the illustration of a conventional drum construction as shown in Fig. 4, it will be noted that the drum element 3c is relatively thick in a radial direction throughout its axial length and is provided with a reinforcing flange 7 of greater radial thickness at its outer peripheral edge. The radial thickness of the drum element 3c is required in order that it will withstand the pressures applied by a brake shoe to its internal braking surface 4c. As has been indicated above, a drum element 3c in conventionally cast drums will have a thickness of from about 1 to 1¾ inches depending upon the size of the drum and the braking pressures encountered. Since the drum element 3c is supported only at its inner end where it engages with the hub 2c, it is much in the nature of a cantilever beam and its outer edge will tend to "bell" or flex outwardly with respect to its inner end when pressure is applied to its braking surface by a brake shoe. To compensate for and prevent such flexing which would otherwise result in an unequal braking pressure over the axial length of the drum, conventionally cast drums are frequently provided with an integral reinforcing flange 7 at its outer edge. In many cases, the reinforcing flange 7 has a radial thickness of 2 inches or more. In addition to the reinforcing flange 7, conventionally cast drums are frequently provided with axially extending corrugations for strength purposes and this also adds to the mass of the metal in the drum element 3c. Increasing the mass of cast metal in the drum element in this manner for reinforcing purposes increases the tendency to develop a heat checked condition.

When a brake shoe is applied to the braking surface 4c, the heat generated results in a rapid temperature rise at the surface 4c to a skin depth initially. In severe braking applications, the surface 4c may be heated to a temperature of 1000° F. or better in a short period of time. However, this temperature rise takes place initially only to a skin depth of the metal at the surface 4c, and the temperature of the metal radially outwardly of the surface 4c will remain relatively cool for a period of time after the braking pressure has been applied due to the relatively low coefficient of heat transfer in cast metals. By reason of the mass of relatively cooler metal radially outwardly of the surface 4c, thermal expansion of the heated skin depth of metal at the surface 3c in a circumferential direction is effectively prevented. The metal at the surface 4c is forced to expand inwardly and this results in a continual flexing or movement of the particles of metal at the surface 4c which eventually results in the development of cracks in the braking surface 4c and the condition known as "heat checking." As the radial thickness of the metal forming the drum element 3c is increased by the addition of more metal throughout its entire axial length or at its end by the provision of an integral reinforcing flange such as the flange 7, the tendency to develop a heat-checking condition is increased.

In accordance with the principles of this invention, and for the purpose of eliminating the heat checking condition referred to above, I provide the outer surface of the drum element 3 with an undercut as at 8 to thereby reduce the radial thickness of the drum element 3 as compared to conventionally cast drums. By providing a drum element 3 of lesser thickness as compared to conventionally cast drums, I have found that the heat checking condition experienced in conventionally cast drums is substantially eliminated. It is believed that the elimination of heat checking by providing a drum element 3 of lesser radial thickness as compared to conventionally cast drums is due to the fact that the drum element 3 has insufficient strength to resist thermal expansion of the drum at its surface 4. In other words, thermal expansion of the drum at its surface 4 is effective to stress and expand the metal at its outer surface 9 which would not be possible in drums of conventional construction having a mass of integrally cast reinforcing metal outwardly of the surface 9 of Fig. 2.

Figure 2:
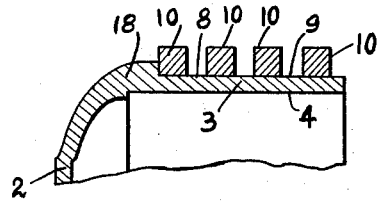
Fig. 2 is a fragmentary sectional view taken substantially along the line II—II of Fig. 1.

The various figures of the drawings illustrate the proportional dimensions of a drum having an internal diameter of approximately 16 inches. In conventional drums of this size, as shown in Fig. 4, the drum element 3c will have a thickness of about 1 inch or a little better. I have found that the heat checking condition can be eliminated by reducing the radial thickness of the element 3 to about ½ inch as illustrated in Fig. 2. While the drum element 3 in Fig. 2 may be made of a lesser thickness than ½ inch, this is not necessary since a reduction of its thickness of the character referred to as compared to conventionally cast drums is sufficient.

By reason of forming the external surface of the drum element 3 with an undercut as at 8, the metal in the drum element 3 has insufficient strength to withstand the braking pressures which would be applied thereto by a brake shoe in normal operation. To provide the strength for withstanding the braking pressures, the drum element 3 is provided with a plurality of reinforcing rings 10 at spaced intervals along its length. In the showing of Figs. 1 and 2, there is illustrated a drum having a 16 inch internal diameter with an axial length of braking surface 4 of about 9 inches and a depth of the metal in the drum element 3 of about ½ inch. The rings 10 applied to the external surface 8 have a radial dimension of about 1 inch and an axial depth of about ¾ inches and are constructed of high tensile steel. While Fig. 2 shows four rings 10, it will be understood that the spacing, size and number of the rings 10 may be varied, it being only necessary that they supply sufficient mechanical strength to prevent belling or radial distortion of the drum element 3 by the force applied thereto by a brake shoe.

In the preferred practice of the invention, the rings 10 are provided with a cold or loose fit on the surface 8. In other words the rings 10 are moved into the position illustrated with both the rings and the drum at room temperature. A loose fit of the rings 10 on the surface 8 is desirable in that there is provided in this manner a small clearance (not shown) between the surface 8 and the internal surfaces of the rings 10 which permits a small initial uncontrolled expansion of the drum 4 before the reinforcing action of the rings 10 becomes effective. This initial uncontrolled expansion is desirable so that internal stresses are relieved by this expansion upon application of a brake shoe to the surface 4.

To hold the rings in position, each ring is provided with a plurality of brazed connections as at 11 connecting the inner edge of the ring at one side thereof to the surface 8. The brazed connections 11 being formed of a softer metal will not interfere with the expansion of the drum element 3.

Figure 3:
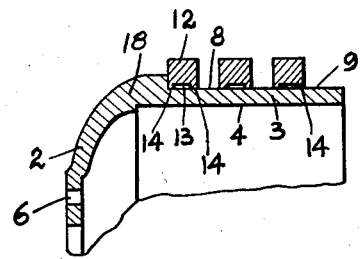
Fig. 3 is a view similar to Fig. 2 illustrating a modified form of the invention.

The modification illustrated in Fig. 3 uses a drum construction as described above in connection with Figs. 1 and 2. In place of the rings 10, there are provided rings 12 of a different type. The rings 12 are undercut as at 13 centrally of their internal surface to provide two spaced ribs 14 at each of the lateral edges of each ring. The rings 12 thus engage the surface 9 of the drum element 3 over two axially spaced annular areas. The space provided by the undercut 13 permits thermal expansion of the material of the drum element 3 underlying such spaces, the reinforcing action being applied to ring areas of relatively small axial dimension through the ribs 14. The rings 12 are preferably provided with a loose fit as described above in connection with the rings 10 and have brazed connections as at 11 at spaced peripheral points.

Figure 5:
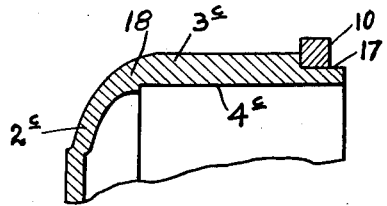
Figs. 5, 6 and 7 are views of modifications respectively illustrating the manner in which the principles of this invention may be applied to the rehabilitation of used drums of conventional construction such as shown in Fig. 4.

As has been further indicated above, the principles of this invention are applicable to the rehabilitation of used drums such as the conventional drum illustrated in Fig. 4. In the case of conventionally constructed drums of this type, heat checking usually begins and is most pronounced in the braking surface area 15 inwardly of the reinforcing flange 7. In such drums, excellent results have been obtained by removing the flange 7 and a portion of the radial thickness of the drum element 3c by a lathe machining operation. The dotted line 16 in Fig. 4 indicates the external contour of the drum after removal of the cast metal in this manner. The metal between the drum surface 4c and the line 16 after removal of the metal in this manner has a thickness of about ½ inch. After the metal is cut away in this manner, a ring 10 is applied to the surface 17 as shown in Fig. 5. The ring 10 in Fig. 5 is provided with brazed connections 11 (not shown) as illustrated in Fig. 1 and preferably is mounted with a loose fit as described above. Where the ring 10 is provided with a loose fit on the surface 17, the braking surface 4c may be machined and reground before application of the ring 10 although this operation may be performed after application of the ring 10.

Figure 6:
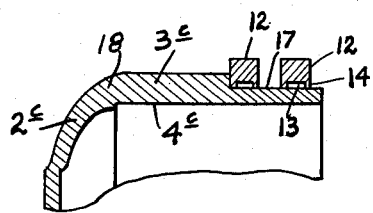

In the modification illustrated in Fig. 6, the conventional used drum is provided with a machined surface 17 of greater axial length so that two rings 10 may be applied thereto as described above. If desired, the drum element 3c may be turned down over a greater axial length so that more rings may be applied thereto.

Figure 7:
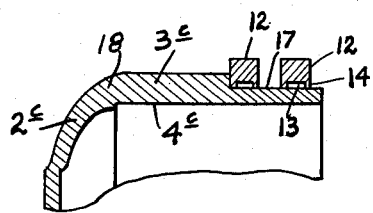

The modification illustrated in Fig. 7 is essentially the same as that shown in Fig. 6, the difference being in that rings 12 as described in connection with Fig. 3 are substituted for the rings 10 of Fig. 6.

The rings 10 and 12 in Figs. 6 and 7 are provided with brazed holding connections 11 and are preferably applied with a loose fit as described in connection with Fig. 5.

As has been indicated, the rings 10 and 12 are mounted with a loose fit on the drum element to thereby provide a small clearance allowing a small expansion of the drum element before their reinforcing action becomes effective. While a loose fit of the rings 10 and 12 is preferred, I have found that improved results are had, particularly in the case of rehabilitated drums, where the rings are provided with a shrink fit on the drum element. Drum elements having rings shrunk on the outer surfaces 9 or 17 have shown an improved ability to stand up under actual operating conditions as compared to conventionally cast drums. Accordingly, it will be understood that the provision of a reinforced drum in which the reinforcing rings 10 and 12 are provided with a shrink fit is contemplated in accordance with the principles of this invention. However, the results obtained with a shrink fit of the rings are not as good as obtained with a loose fit in accordance with the preferred practice of the invention. When the rings are shrunk on the drum element, the braking surface of the drum element under actual operating conditions shows a tendency to develop heat checking in annular areas immediately inwardly of the reinforcing rings, the remaining areas of the braking surface being clear of such indication. This tendency, however, is not as pronounced as in conventionally cast drums indicating that the stressing of the metal directly inwardly of the reinforcing rings is relieved through the metal directly inwardly of the spaces between the reinforcing rings.

From the foregoing, it will be apparent that this invention provides, in both the newly constructed drum of Figs. 1–3 and in the rehabilitated drums of Figs. 5–7, a brake drum of improved construction in which the drum element 3 has a thickness in a radial direction significantly less than in conventional drums and in which the reinforcing rings 10 and 12 provide the mechanical strength for resisting radial outward flexing action of the drum element. Attention is particularly directed to the fact that the hub 2 and element 3 are cast integrally by the same casting operation. Attention is also directed to the fact that the hubs 2 in all modifications including the showings of Figs. 1–3 are conventional and that the metal at the junction point 18 of the drum element to the hub is of the same thickness as conventional drums, the radial thickness of the drum elements 3 and 3c being considerably less than conventional drums at a point axially outwardly of the point 18. This is true both in the case where the drum is cast originally with an undercut as at 8 in Figs. 1–3, and in the case where the metal of a conventional drum element is removed by a machining operation to the line 16 of Fig. 4 to provide the undercut surface 17 as in Figs. 5–7. While the rehabilitated drums of Figs. 5–7 are provided with an undercut 17 which extends inwardly from the outer edge a relatively short axial distance sufficient for mounting only one or two reinforcing rings, such drums have proved successful under normal operating conditions and have demonstrated an ability to stand up for a greater period of time without developing a heat checking condition than conventionally cast drums.

Attention is also directed to the fact that a drum having spaced reinforcing rings 10 and 12 provides an improved construction with respect to cooling. The drum element 3 being undercut so that it has a lesser radial depth than conventional cast drums provides less metal through which heat generated at the braking surface 4 or 4c has to travel. As a consequence, the heat can get to the portions of the surface 8 and 17 between the spaced rings 10 or 12 in a shorter period of time and be dissipated to the atmosphere.

While I have illustrated and described several specific embodiments of my invention, it will be understood that this is merely by way of illustration, and that various changes and modifications may be made therein within the contemplation of the invention and under the scope of the following claims:

I claim:
1. A cast steel brake drum comprising a hub for attachment to a vehicle wheel and a cylindrical drum element providing an internal braking surface cast integrally with and projecting axially outwardly from the periphery of said hub, said drum element having its outer surface undercut for at least a portion of its axial length extending from its outer edge inwardly toward said hub, the radial thickness of such undercut portion being such that heat generated at said internal braking surface is ineffective to cause "heat checking" at said braking surface, and a steel reinforcing ring on said undercut portion for limiting its expansion in a radial direction.

2. A cast steel brake drum comprising a hub for attachment to a vehicle wheel and a cylindrical drum element providing an internal braking surface cast integral with and extending outwardly from the periphery of said hub, said cylindrical drum element having an axially extending portion disposed outwardly from said hub and of a reduced radial thickness permitting ready initial expansion of the exterior surface of said portion under braking pressure and freeing the interior surface receiving the braking pressure for expansion, and a metal reinforcing ring mounted concentrically of said axially extending portion for limiting radial expansion thereof, said ring having an undercut centrally of its internal surface providing a pair of spaced annular ribs for engagement with said external surface at axially spaced points.

References Cited in the file of this patent
UNITED STATES PATENTS

| | | |
|---|---|---|
| 1,702,391 | Price | Feb. 19, 1929 |
| 1,704,033 | Cautley | Mar. 5, 1929 |
| 1,796,835 | Dodge | Mar. 17, 1931 |
| 1,814,575 | Tatter | July 14, 1931 |
| 1,875,114 | Norton | Aug. 30, 1932 |
| 1,884,104 | Moore | Oct. 25, 1932 |
| 2,016,871 | Nelson | Oct. 8, 1935 |
| 2,087,907 | Gottlieb et al. | July 27, 1937 |
| 2,182,238 | Rasmussen | Dec. 5, 1939 |
| 2,293,997 | Neuhaus | Aug. 25, 1942 |
| 2,398,501 | Le Jeune | Apr. 16, 1946 |
| 2,422,462 | Ash | June 17, 1947 |